J. Simpson.
Compound Lever.
No. 85,864. Patented Jan. 12, 1869.
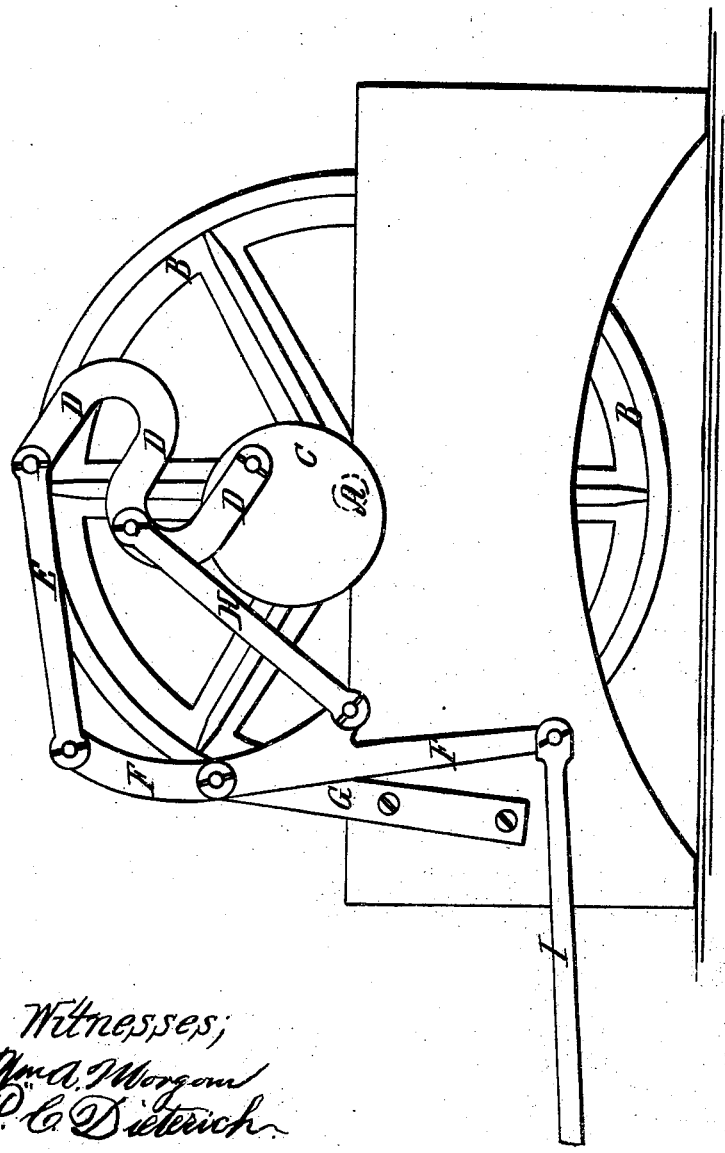
Witnesses;
Wm. A. Morgan
P. C. Dieterich
Inventor;
John Simpson
per Wm Mills
Attorneys

JOHN SIMPSON, OF MARIETTA, GEORGIA.

Letters Patent No. 85,864, dated January 12, 1869.

IMPROVEMENT IN COMPOUND LEVERS.

The Schedule referred to in these Letters Patent and making part of the same.

*To all whom it may concern:*

Be it known that I, JOHN SIMPSON, of Marietta, in the county of Cobb, and State of Georgia, have invented a new and useful Improvement in Compound Levers; and I do hereby declare that the following is a full, clear, and exact description thereof, which will enable those skilled in the art to make and use the same, reference being had to the accompanying drawings, forming part of this specification, in which the figure is a side view of my improved compound lever connected with a shaft.

My invention has for its object to furnish an improved device for converting rectilinear into circular motion, which shall be convenient and effective, and less liable to become set upon the dead-point than the ordinary means for this purpose; and It consists in the combination of the various parts of the device, as hereinafter more fully described.

A represents a shaft, revolving in bearings in the ordinary manner.

B represents the fly-wheel of the shaft A.

To the end of the shaft A is attached a crank or crank-wheel, C, to the crank-pin of which is pivoted one end of the crooked or S-shaped lever D.

To the other or free end of the working lever D is pivoted the end of the connecting-rod E, the other end of which is pivoted to the end of the fulcrum-lever F, which is pivoted to some suitable support, as. G.

H is a connecting-rod, one end of which is pivoted to the lever F, at about the same distance from the fulcrum of said lever as is the end of the rod E.

The other end of the connecting-rod H is pivoted to the inner bend of the working lever D, as shown in the figure.

To the extended end of the lever F is pivoted the end of the lever, pitman, or piston-rod I, as the case may be.

By this construction, as the long arm of the lever F is moved in one or the other direction, one of the connecting-rods E H pushes, and the other pulls upon the lever D, the combined effect acting upon the crank or crank-wheel C, to give motion to the shaft A.

By means of this device, the points of the application of power are so distributed that it will be almost impossible for the said device to become set upon the dead-point, or, in fact, to have any dead-point.

I claim as new, and desire to secure by Letters Patent—

The combination of the S-shaped working lever D, fulcrum-lever F, and connecting-rods E and H, with each other and with the crank or crank-wheel C, and piston-rod, connecting-rod, or lever I, substantially as herein shown and described, and for the purposes set forth.

The above specification of my invention signed by me, this 10th day of October, 1868.

JOHN SIMPSON.

Witnesses:
JAMES M. WILSON,
JOHN M. WALKER.